Figure 1:
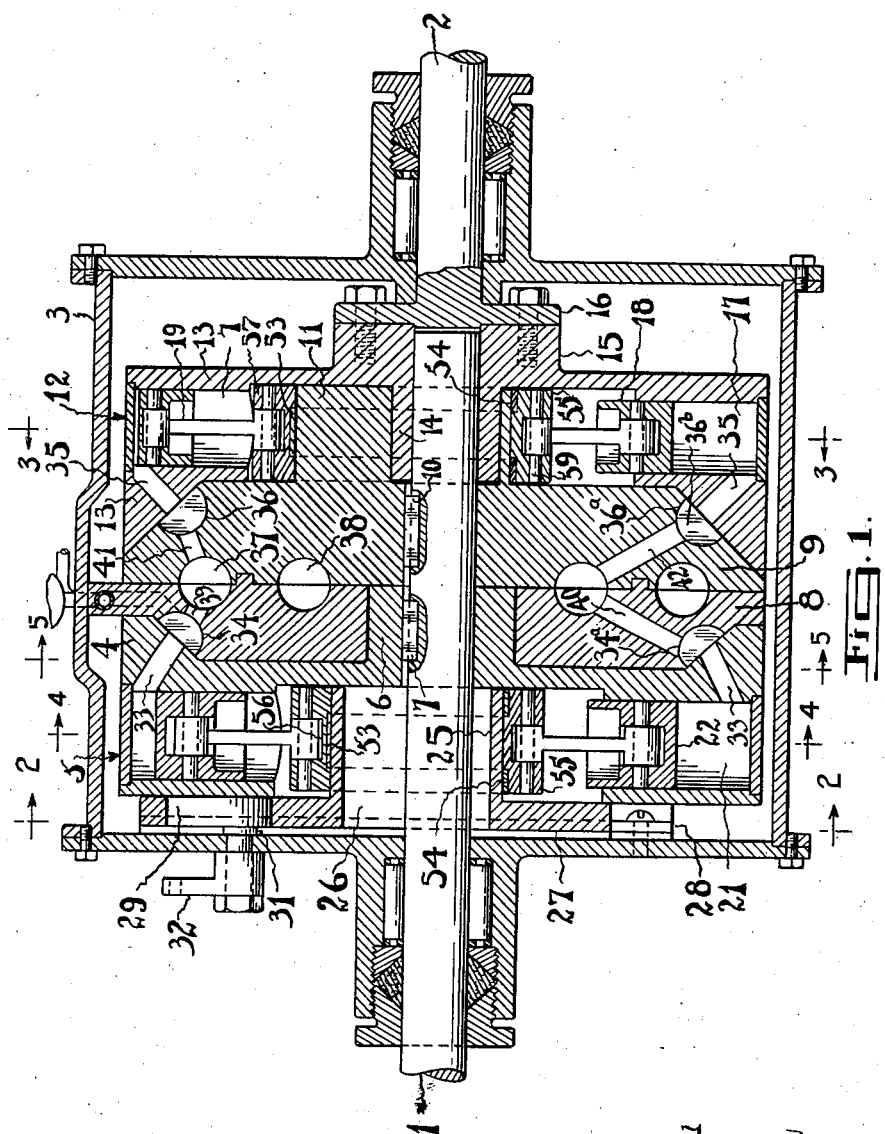

Oct. 7, 1941.  D. W. FLETCHER  2,257,792
HYDRAULIC TRANSMISSION
Filed Sept. 25, 1939    3 Sheets-Sheet 1

Inventor
D. W. Fletcher
by J Edw. Maybee

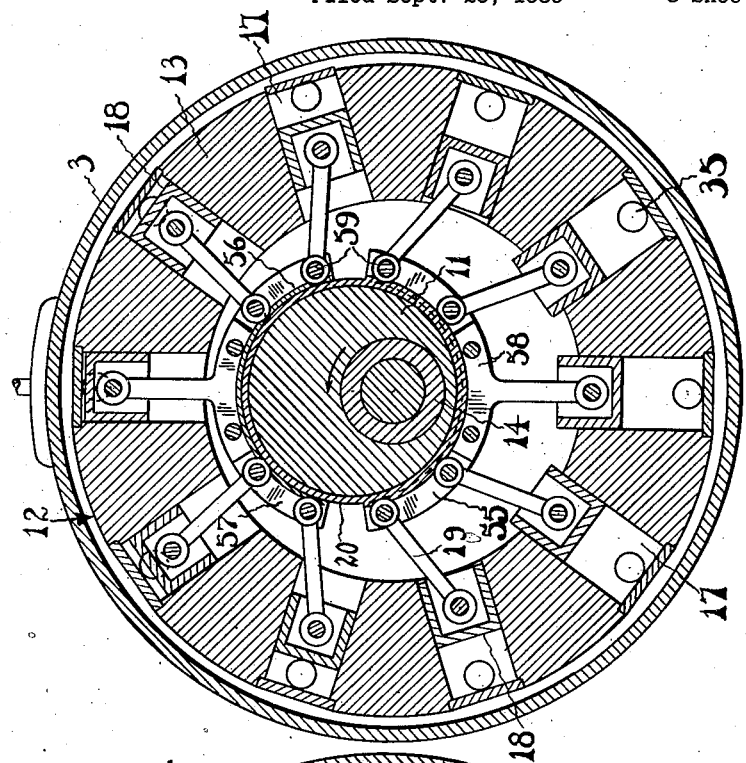
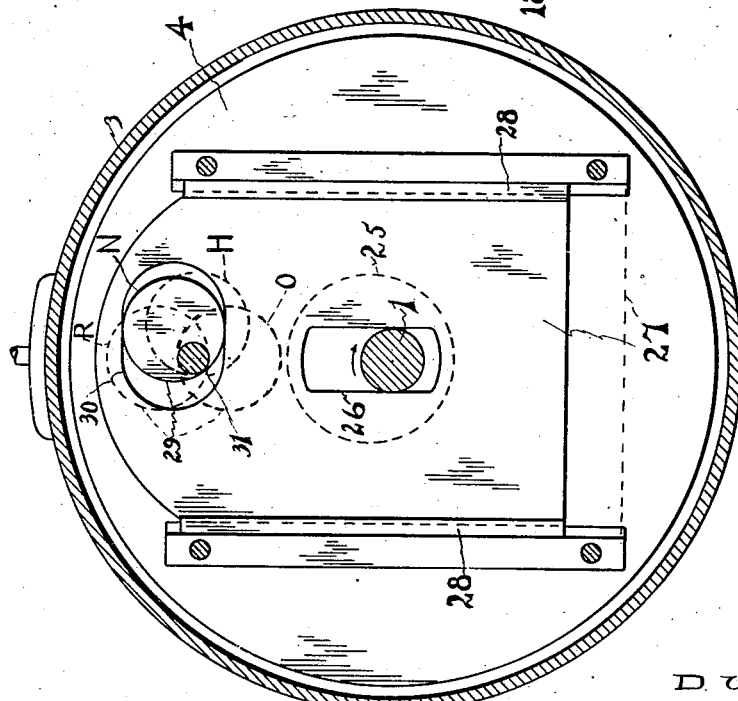

Oct. 7, 1941.  D. W. FLETCHER  2,257,792
HYDRAULIC TRANSMISSION
Filed Sept. 25, 1939  3 Sheets-Sheet 3
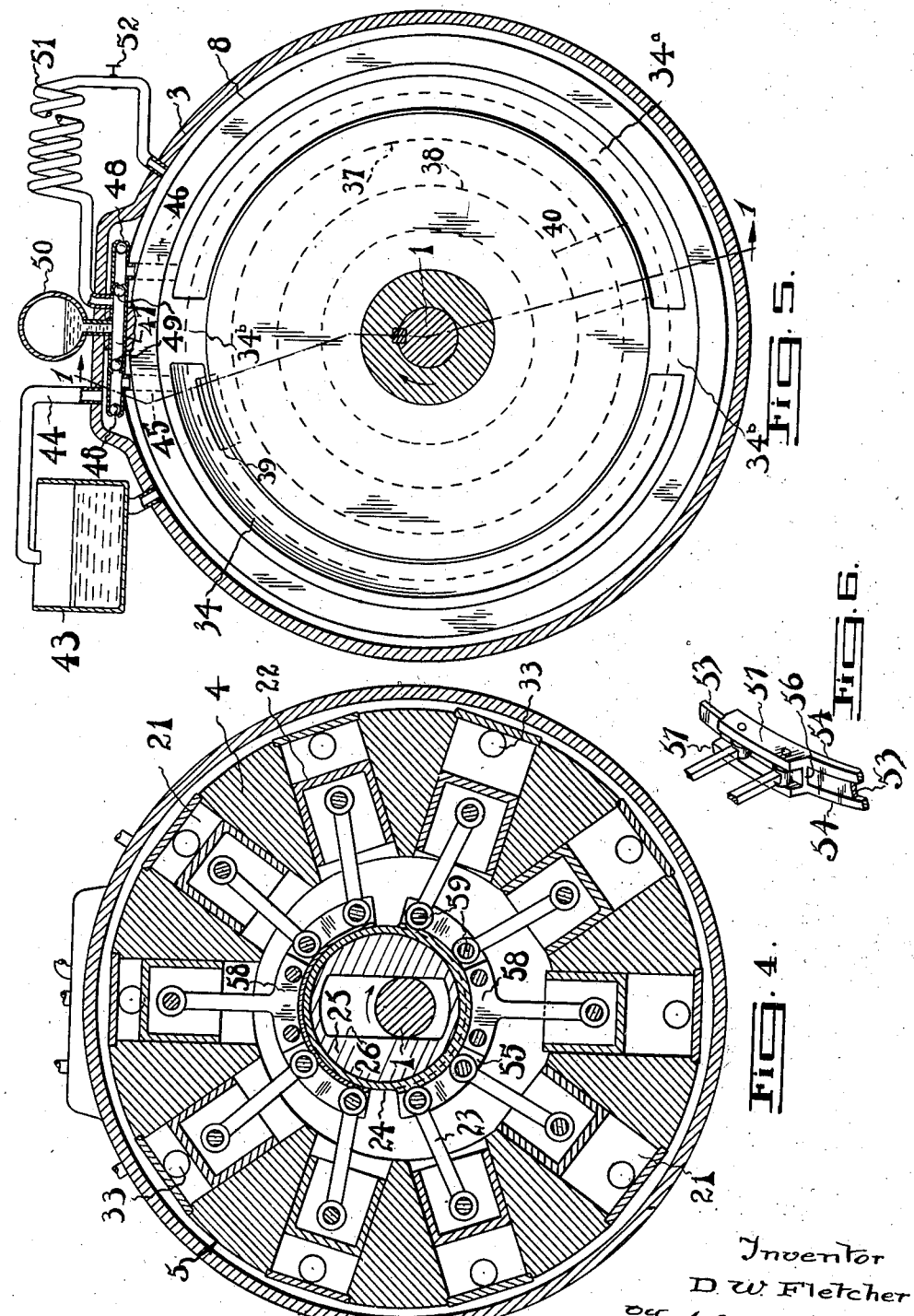
Inventor
D. W. Fletcher
By J. Edw. Maybee
ATTY.

Patented Oct. 7, 1941

2,257,792

UNITED STATES PATENT OFFICE 2,257,792

HYDRAULIC TRANSMISSION

Daniel W. Fletcher, Toronto, Ontario, Canada

Application September 25, 1939, Serial No. 296,392

1 Claim. (Cl. 60—53)

This invention relates to hydraulic transmissions, and more particularly to the type in which primary and secondary pumps are used for varying the speed or reversing the direction of movement of the driven member of the transmission, and my object is to provide simple apparatus of this character which may be made cheaply and yet be durable and efficient.

I attain my object by providing a drive shaft along which are disposed the secondary or control pump, two disks and the primary or motor pump. The cylinder block of the secondary pump and one of the disks, which is provided with an eccentric for the primary pump, are keyed on the drive shaft. The cylinder block of the primary pump is secured to the driven shaft. The eccentric for the secondary pump is movable relative to the drive shaft to vary the stroke of said pump and is carried on a slide which is guided on the adjacent end wall of a stationary casing for housing the pumps and the disks. The slide is moved by means of an eccentric which may be manually or automatically controlled to cause the speed of the driven member to be varied.

The constructions are hereinafter more fully described and are illustrated in the accompanying drawings in which—

Fig. 1 is a longitudinal section of the transmission taken on the line 1—1 in Fig. 5;

Fig. 2 a cross section on the line 2—2 in Fig. 1;

Fig. 3 a cross section on the line 3—3 in Fig. 1;

Fig. 4 a cross section on the line 4—4 in Fig. 1;

Fig. 5 a cross section on the line 5—5 in Fig. 1, the outer rim of the cylinder block being omitted and the stationary disk being shown in side elevation on said line 5—5; and Fig. 6 a detail in perspective of a portion of the eccentric straps.

In the drawings like numerals of reference indicate corresponding parts in the different figures.

1 and 2 are the drive and driven shafts respectively which are suitably journalled in bearings carried by the opposite end walls of a casing 3. The cylinder block 4 of the secondary pump 5 is provided with a hub 6 which is keyed at 7 to the drive shaft. The hub is journalled in a stationary disk 8 which contacts with a rotatable disk 9 keyed at 10 to the drive shaft. The side face of the rotatable disk 9, remote from the stationary disk 8, has an eccentric 11 formed thereon for actuating a primary pump 12. The cylinder block 13 of the pump 12 has a hub 14, on which the eccentric 11 is journalled, and a hub 15 which is suitably secured to a flange 16 on the driven shaft 2. The end of the drive shaft 1 adjacent the driven shaft 2 is journalled in the hubs 14 and 15 of the cylinder block so that the said end is supported from the bearing for the driven shaft 2.

The cylinder block 13 of the primary pump 12 has a plurality of radially disposed bores 17 in which pistons 18 are fitted. The pistons are connected by rods 19 with an eccentric strap 20 on the eccentric 11. The construction of the secondary pump 5 is similar to that of the primary pump 12 except the bores 21, in the secondary pump cylinder block 4, and the pistons 22 therein are larger in diameter than the bores 17 and pistons 18 of the primary pump. The pistons 22 are connected by rods 23 with an eccentric strap 24 on a non-rotatable eccentric 25 which is freely disposed on the drive shaft 1 and adjustable relative thereto to vary the stroke of the secondary pump pistons.

The eccentric 25 is provided with a vertical slot 26 through which the drive shaft 1 passes, and is carried on a slide 27 mounted in a guide 28 on the adjacent end wall of the casing 3. The slide is vertically adjusted by means of an eccentric 29 which operates in a horizontal opening 30 in the slide. The eccentric 29 is secured to a spindle 31 which is journalled in the aforesaid end wall of the casing and is provided with a crank arm 32 which may be manually or automatically operated.

The cylinder block 4 is provided with ports 33 which form communications between the bores 21 and one or the other of two circumferentially separated grooves 34, 34ª formed at the same radius in the face of the stationary disk 8 in contact with said block 4. Each of the grooves extends slightly less than 180° around the face of the disk. The grooves are separated by the dams 34ᵇ arranged diametrically opposite one another so that all the pump cylinders or bores 21 on the pressure side of the eccentric 25 will be in communication with one of the grooves while the other pump cylinders 21 on the suction side of the eccentric will be in communication with the other of the grooves. Thus, as the cylinders 21 revolve, their ports will communicate first with one groove 34, 34ª and then with the other, the dams 34ᵇ being adapted to prevent communication with both grooves at the one time.

The cylinder block 13 of the primary pump 12 is also provided with ports 35 forming communications between the bores 17 and one or the other of two circumferentially separated grooves 36, 36ª formed in the face of the rotary disk 9 in contact with said block 13. These grooves are similar to the grooves 34, 34ª and are separated by dams 36ᵇ which are diametrically opposite one another so that all the pump cylinders or bores 17 on the pressure side of the eccentric 11 will be in communication with one of the grooves while the other cylinders 17 on the suction side of the eccentric will be in communication with the other groove.

In the contacting faces of the stationary and rotary disks 8 and 9 are formed two annular passageways 37 and 38. The disk 8 is provided with passages 39 and 40 forming communications between the passageways 37, 38 and the grooves 34, 34ª respectively. The grooves 36, 36ª in the disk 9 communicate by passages 41 and 42 with the passageways 37, 38 respectively.

When the transmission is in neutral or is operating to drive the driven shaft 2 in the same direction of rotation as the drive shaft 1 up to a one to one drive ratio between said shafts, oil or other fluid in the pump cylinders 17 may pass freely from the ports 35 on the high pressure side of the primary pump 12, as positioned in the drawings relative to the grooves 34 and 34ª, through the groove 36ª, passage 42, passageway 38, passage 40, groove 34ª to the ports 33 communicating with the cylinders 21 on the low pressure side of the secondary pump 5. The cylinders 21 on the high pressure side of pump 5 will then be in communication with the low pressure side of the primary pump 12 by means of the other ports 33, the groove 34, passage 39, passageway 37, passage 41, the other groove 36 and the other ports 35 communicating with the cylinders 17 on the low pressure side of the primary pump 12. The flow of oil from one pump to the other is thus in a closed circuit which is adapted to be maintained full of liquid as hereinafter described.

Assuming the control eccentric 29 is positioned at N, as shown in full lines in Fig. 2, the drive shaft 1 is rotated, and the capacities of the primary and secondary pumps are equal, the oil will flow as described in the preceding paragraph but, because of the equal capacities of the pumps, the cylinder block 13 will not be rotated. As the eccentric 29 is moved towards the position indicated at H, the eccentric 25 is moved by the slide 27 to decrease the stroke of the pistons 22 of the secondary pump 5 until the eccentric 25 is concentric with the shaft 1. During this movement of the eccentric 25, the capacity of the secondary pump is gradually decreased which results in the cylinder block 13 being rotated and its speed being increased until a one to one drive ratio is established which occurs when the capacity of the secondary pump is zero.

A continued movement of the control eccentric 29 from the position H to the position indicated at O causes the center of the eccentric 25 to move past the center of the drive shaft 1 whereby the initially high pressure cylinders or bores 21 of the secondary pump 5 become low pressure cylinders or bores and the previously low pressure cylinders 21 become high pressure cylinders which causes the direction of flow of fluid to be reversed. The high pressure flow is therefore from the secondary pump 5 to the high pressure side of the primary pump 12 which increases the speed of the primary pump cylinder block 13 and thus that of the driven shaft 2 in excess of the drive shaft 1.

When the control eccentric 29 is moved to the position indicated at R the capacity of the secondary pump 5 is greater than that of the primary pump 12 whereby the rate of flow from the high pressure side of the secondary pump to the low pressure side of the primary pump is increased which results in the direction of rotation of the primary pump cylinder block 13 and thus of the driven shaft 2 being reversed.

The casing 3 is maintained filled with oil from a reservoir 43 into which a pipe 44 is directed for venting the casing. Any oil carried by air or gas through the pipe 44 will thus discharge into the reservoir. Any oil leaking from the circuit is replenished by the supply in the reservoir. The stationary disk 8 carries two oil lines 45, 46 which communicate with the grooves 34, 34ª respectively on opposite sides of a dam 34ᵇ. The oil lines 45, 46 are connected by a horizontal tube 47 which is provided with two sets of check valves 48, 49 whereby oil may be drawn into the low pressure groove 34 or 34ª and the high pressure groove 34ª or 34 will communicate with an air dome 50 and an oil cooler 51. Either of the inlet check valves 48 may thus be used to draw in oil from the casing to one of the grooves 34, 34ª, and either of the check valves 49 may be employed to establish communication between the other of the said grooves and the tube 47. The flow of oil through the cooler will be controlled by a valve 52.

The eccentric straps 20 and 24 are identical in construction although they might differ in size. Each strap comprises inner and outer rings 53 and 54 which are adapted to be fitted on an eccentric 11 or 25. The inner ring is provided with two spaced apart flanges 55 which extend slightly less than 180° circumferentially of the ring and project laterally to overlie the outer rings. The latter are joined together by a band 56 which overlies slightly less than 180° of the unflanged portion of the inner ring 53. The band is provided with flanges 57 which are also spaced apart and extend around the band. The inner ring flanges and the outer ring flanges are each rigidly connected substantially midway of their ends with diametrically opposite connecting rods having T ends 58, while the other connecting rods of each pump are pivotally mounted on pins 59 which are carried by the flanges and extend across the spaces therebetween. With this arrangement the rods are maintained at their most efficient angle to reduce wear on the walls of the cylinders and pistons.

What I claim as my invention is:

In a hydraulic transmission the combination with driving and driven members, of means including primary and secondary pumps for causing the driven member to be actuated from the driving member, a stationary casing for housing said pumps, the primary pump including a cylinder block connected with the driven member and having a plurality of radially disposed bores therein; pistons in said bores; a disk rotatable with the driving member and provided with an eccentric; means operated by the eccentric for actuating the pistons, the secondary pump including a cylinder block rotatable with the driving member and having a plurality of radially disposed bores therein; a stationary disk arranged beside the rotatable disk, the disks being between the cylinder blocks and having two annular passageways formed in their contacting faces, each disk also being provided with two circumferentially separated grooves in its face in contact with the adjacent cylinder block, the grooves being of the same radius and each groove extending slightly less than 180° around the face of the disk, one of the grooves in each disk being in communication with one of the annular passageways and the other of the grooves in each disk being in communication with the other of the annular passageways; ports in each cylinder block forming communications between each bore and one or the other of the two separated grooves in the adjacent disk; pistons in said bores of the secondary pump cylinder block; means including a non-rotatable eccentric freely disposed on the driving member and adjustable relative thereto for actuating the pistons of the secondary pump; and means for moving the eccentric relative to the driving member to vary the stroke of the secondary pump pistons.

DANIEL W. FLETCHER.